US012681204B2

(12) United States Patent
Ding et al.

(10) Patent No.: US 12,681,204 B2
(45) Date of Patent: Jul. 14, 2026

(54) MULTI-SECTOR DATA CORRECTION METHOD AND SYSTEM FOR GAMMA IMAGING WHILE DRILLING

(71) Applicants: CHINA PETROLEUM & CHEMICAL CORPORATION, Beijing (CN); SINOPEC PETROLEUM ENGINEERING TECHNOLOGY SERVICE CO., LTD, Beijing (CN); SINOPEC SHENGLI PETROLEUM ENGINEERING CO., LTD, Dongying (CN); SINOPEC MATRIX CORPORATION, Qingdao (CN); GEOSTEERING & LOGGING RESEARCH INSTITUTE, SINOPEC MATRIX CORPORATION, Qingdao (CN)

(72) Inventors: Luyang Ding, Dongying (CN); Ningning Yang, Dongying (CN); Haiquan Tang, Dongying (CN); Xizhou Wang, Dongying (CN); Zhen Yang, Dongying (CN); Nan Lin, Dongying (CN); Mingquan Huang, Dongying (CN); Qinglong Liu, Dongying (CN); Quanjin Yang, Dongying (CN); Xiaolin Zhang, Dongying (CN); Zhiyong Zhang, Dongying (CN); Chuntian Han, Dongying (CN); Hai Ma, Dongying (CN); Xiaohui Cui, Dongying (CN); Chao Lu, Dongying (CN); Xin Cheng, Dongying (CN)

(73) Assignees: CHINA PETROLEUM & CHEMICAL CORPORATION, Beijing (CN); SINOPEC PETROLEUM ENGINEERING TECHNOLOGY SERVICE CO., LTD, Beijing (CN); SINOPEC SHENGLI PETROLEUM ENGINEERING CO., LTD, Dongying (CN); SINOPEC MATRIX CORPORATION, Qingdao (CN); GEOSTEERING & LOGGING RESEARCH INSTITUTE, SINOPEC MATRIX CORPORATION, Qingdao (CN)

( * ) Notice: Subject to any disclaimer, the term of this patent is extended or adjusted under 35 U.S.C. 154(b) by 529 days.

(21) Appl. No.: 18/249,155

(22) PCT Filed: Oct. 15, 2021

(86) PCT No.: PCT/CN2021/123963
§ 371 (c)(1),
(2) Date: Apr. 14, 2023

(87) PCT Pub. No.: WO2022/078477
PCT Pub. Date: Apr. 21, 2022

(65) Prior Publication Data
US 2023/0393300 A1      Dec. 7, 2023

(30) Foreign Application Priority Data
Oct. 16, 2020    (CN) ......................... 202011107176.9

(51) Int. Cl.
*G01V 5/12* (2006.01)
*E21B 47/12* (2012.01)
*G06F 17/16* (2006.01)

(52) U.S. Cl.
CPC ............... *G01V 5/12* (2013.01); *E21B 47/12* (2013.01); *G06F 17/16* (2013.01)

(58) Field of Classification Search
CPC ....... G01V 5/15; E21B 47/12; E21B 2200/20; E21B 41/00; E21B 47/0025;
(Continued)

(56) References Cited

U.S. PATENT DOCUMENTS 6,215,120 B1 * 4/2001 Gadeken .................. G01V 5/04
250/266
(Continued)

FOREIGN PATENT DOCUMENTS

| CN | 103163548 A | 6/2013 |
| CN | 105545284 A | 5/2016 |

(Continued)

*Primary Examiner* — Yossef Korang-Beheshti
(74) *Attorney, Agent, or Firm* — NKL Law; Allen Xue

(57) ABSTRACT
A multi-sector data correction method for gamma imaging while drilling includes the steps of: (a) dividing each gamma imaging sector into a plurality of counting zones; (b) counting a number of valid counting pulses for each counting zone
(Continued)

at a predetermined time interval during MWD; (c) constructing a plurality of measurement vectors based on a value of recording times of each counting zone; (d) establishing a correction matrix with a conditional number less than a set value through an optimization algorithm; and (e) calculating a gamma intensity of each measured sector with the plurality of measurement vectors and the correction matrix as constructed, so as to complete the correction on the measurement data of each measured sector for each predetermined time interval. This method eliminate problems such as rotational measurement distortion of the gamma imaging while drilling tool and improve the accuracy of calculating the formation dip angle.

9 Claims, 7 Drawing Sheets

(58) Field of Classification Search
CPC ........ E21B 47/026; E21B 7/04; E21B 47/022; G06F 17/16; G06F 17/18
See application file for complete search history.

(56) References Cited

U.S. PATENT DOCUMENTS

| | | | | |
|---|---|---|---|---|
| 2014/0374582 | A1* | 12/2014 | Guo | G01V 5/125 250/269.3 |
| 2015/0331138 | A1* | 11/2015 | Estes | G01V 13/00 324/346 |
| 2018/0022365 | A1 | 1/2018 | Bissels et al. | |
| 2019/0017326 | A1* | 1/2019 | Orban | E21B 3/02 |
| 2019/0353023 | A1* | 11/2019 | Whitacre | E21B 47/024 |

FOREIGN PATENT DOCUMENTS

| | | |
|---|---|---|
| CN | 108625845 A | 10/2018 |
| RU | 2596080 C2 | 8/2016 |

* cited by examiner

MULTI-SECTOR DATA CORRECTION METHOD AND SYSTEM FOR GAMMA IMAGING WHILE DRILLING

CROSS-REFERENCE OF RELATED APPLICATION

This application is a U.S. national stage entry of PCT International Application No. PCT/CN2021/123963, filed on Oct. 15, 2021, which claims the priority of Chinese patent application CN 202011107176.9, entitled "Multi-sector data correction method and system for gamma imaging while drilling" and filed on Oct. 16, 2020, the content of which is incorporated herein by reference in its entirety.

TECHNICAL FIELD

The present invention relates to the field of geosteering for petroleum exploration, and specifically to multi-sector data correction method and system for gamma imaging while drilling.

TECHNICAL BACKGROUND

Gamma imaging technology is one of the key technologies in the fields of logging-while-drilling and geosteering. It is a technology to analyze the formation through measuring the gamma intensity of the wellbore, and plays an important role in establishing formation models, improving the probability of penetration of reservoirs, increasing crude oil production, and so on.

Specifically, in this technology, the wellbore is divided along the circumferential direction into multiple sectors, which are measured by means of a gamma sensor with azimuth blanking, and then the gamma intensity of the wellbore is imaged three-dimensionally with data from these sectors.

The results can be used to calculate the formation dip angle, thus achieving quantized geosteering drilling. However, the existing gamma imaging technology suffers a low accuracy and presents a large error in calculating the formation dip angle, so that it cannot provide the effect of geosteering. Therefore, there is an urgent need in the industry for a correction method to improve the imaging accuracy.

SUMMARY OF THE INVENTION

One of the technical problems to be solved by the present invention is to provide a technical solution capable of providing high-precision gamma imaging, thereby achieving high-precision geosteering drilling and formation evaluation.

In order to solve the above technical problems, an embodiment of the present invention provides a multi-sector data correction method for gamma imaging while drilling, comprising steps of: (a) dividing each gamma imaging sector into a plurality of counting zones; (b) counting a number of valid counting pulses for each counting zone at a predetermined time interval during measurement while drilling; (c) constructing a plurality of measurement vectors featuring measurement results of all sectors based on a value of recording times of each counting zone; (d) establishing a correction matrix with a conditional number less than a set value, said correction matrix being used to correct measurement data; and (e) calculating a gamma intensity of each measured sector with the plurality of measurement vectors and the correction matrix as constructed, so as to complete the correction on the measurement data of each measured sector for each predetermined time interval.

In an embodiment, in said Step (c), all the counting zones are divided into a plurality of groups, and the value of recording times of each counting zone in each group is used to construct a corresponding measurement vector. A number of groups into which the counting zones are divided is equal to a number of the counting zones formed by equally dividing each sector, and each group of counting zones is composed of the counting zones that are discontinuously extracted from each sector. Any adjacent counting zones in a same sector are not in a same group.

In an embodiment, in said Step (e), the gamma intensity G of each measured sector is calculated with an expression as follows:

$$G = \gamma^{-1} \cdot (M_1 + M_2 + \ldots + M_n)$$

wherein $M_n$ denotes the $n^{th}$ measurement vector, $\gamma$ is the correction matrix, $\gamma = \gamma_1 + \gamma_2 + \ldots + \gamma_n$, and $\gamma_n$ denotes the $n^{th}$ optimization matrix.

In an embodiment, in said Step (c), all the counting zones are divided into two groups, and a first measurement vector and a second measurement vector are constructed respectively with the value of recording times per unit time for each counting zone in each group, wherein each group of the counting zones is formed by discontinuously extracting the counting zones from consecutive counting zones arranged along a circumferential direction, any adjacent counting zones not being in the same group. Said first measurement vector is a one-dimensional vector, each vector unit of which is a value of recording times per unit time for each counting zone in a first group of counting zones, these values being arranged in a sequence corresponding to the counting zones in the circumferential direction. Said second measurement vector is a one-dimensional vector, each vector unit of which is a value of recording times per unit time for each counting zone in a second group of counting zones, these values being arranged in a same way as those of the first measurement vector and with a same starting point.

In an embodiment, the step of constructing said correction matrix comprises: determining a number of units within the correction matrix based on a number of groups of all counting zones; setting an adjustment coefficient and multiple correction coefficients, wherein a number of correction coefficients is equal to a sum of a number of elements of the first measurement vector and that of the second measurement vector; establishing, based on the adjustment coefficient and multiple correction coefficients, a correction unit matrix for each measurement vector, thereby forming the correction matrix; and determining, based on the vector composed of said multiple correction coefficients as an independent variable, an optimal independent variable for which the conditional number of the correction matrix reaches or approaches a global minimum through an optimization algorithm, thereby obtaining an optimal correction matrix with the optimal independent variable.

In an embodiment, in said Step (d), a correction matrix $\gamma$ with a conditional number less than 10 is constructed with an expression as follows:

$$\gamma = \gamma_1 + \gamma_2$$

wherein $\gamma_1$ is expressed as follows:

$$\gamma_1 = \begin{bmatrix} a \cdot \varphi_1 & \varphi_1 & 0 & 0 & \ldots & 0 \\ 0 & a \cdot \varphi_3 & \varphi_3 & 0 & \ldots & 0 \\ 0 & 0 & a \cdot \varphi_5 & \varphi_5 & 0 & 0 \\ 0 & 0 & 0 & a \cdot \varphi_7 & \varphi_7 & 0 \\ \vdots & \vdots & 0 & 0 & \ddots & \vdots \\ \varphi_{2n-1} & 0 & 0 & 0 & \ldots & a \cdot \varphi_{2n-1} \end{bmatrix}$$

and $\gamma_2$ is expressed as follows:

$$\gamma_2 = \begin{bmatrix} \varphi_2 & a \cdot \varphi_2 & 0 & 0 & \ldots & 0 \\ 0 & \varphi_4 & a \cdot \varphi_4 & 0 & \ldots & 0 \\ 0 & 0 & \varphi_6 & a \cdot \varphi_6 & 0 & 0 \\ 0 & 0 & 0 & \varphi_8 & a \cdot \varphi_8 & 0 \\ \vdots & \vdots & 0 & 0 & \ddots & \vdots \\ a \cdot \varphi_{2n} & 0 & 0 & 0 & \ldots & \varphi_{2n} \end{bmatrix}$$

wherein n denotes a number of sectors to be measured, a denotes the adjustment coefficient, and $[\varphi_1, \varphi_2, \varphi_3, \ldots, \varphi_{2n}]$ denotes the vector of correction coefficients.

In an embodiment, in said Step (e), the gamma intensity G of each measured sector is calculated with an expression as follows:

$$G = \gamma^{-1} \cdot (M_1 + M_2)$$

wherein $M_1$ and $M_2$ denote the first and second measurement vectors, respectively, and $\gamma$ denotes the correction matrix after optimization.

According to another aspect of the present invention, a multi-sector data correction system for gamma imaging while drilling is provided, comprising: a counting-zone dividing module, configured to divide each gamma imaging sector into a plurality of counting zones; a pulse recording module, configured to count a number of valid counting pulses for each counting zone at a predetermined time interval during measurement while drilling; a measurement-vector constructing module, configured to construct a plurality of measurement vectors featuring measurement results of all sectors based on a value of recording times of each counting zone; a correction-matrix establishing module, configured to establish a correction matrix with a conditional number less than a set value through an optimization algorithm, said correction matrix being used to correct measurement data; and a gamma-intensity calculating module, configured to calculate a gamma intensity of each measured sector with the plurality of measurement vectors and the correction matrix as constructed, so as to complete the correction on the measurement data of the measured sector for each predetermined time interval.

In an embodiment, the measurement-vector constructing module is configured to divide all the counting zones into a plurality of groups, and construct a corresponding measurement vector with the value of recording times of each counting zone in each group. A number of groups into which the counting zones are divided is equal to a number of the counting zones formed by equally dividing each sector, and each group of counting zones is composed of the counting zones that are discontinuously extracted from each sector. Any adjacent counting zones in a same sector are not in a same group.

In an embodiment, the gamma-intensity calculating module is configured to calculate the gamma intensity G of each measured sector with an expression as follows:

$$G = \gamma^{-1} \cdot (M_1 + M_2 + \ldots + M_n)$$

wherein $M_n$ denotes the $n^{th}$ measurement vector, $\gamma$ is the correction matrix, $\gamma = \gamma_1 + \gamma_2 + \ldots + \gamma_n$, and $\gamma_n$ denotes the $n^{th}$ optimization matrix.

In an embodiment, the measurement-vector constructing module is configured to divide all the counting zones into two groups, and construct a first measurement vector and a second measurement vector respectively with the value of recording times per unit time for each counting zone in each group, wherein each group of the counting zones is formed by discontinuously extracting the counting zones from consecutive counting zones arranged along a circumferential direction, any adjacent counting zones not being in the same group. Said first measurement vector is a one-dimensional vector, each vector unit of which is a value of recording times per unit time for each counting zone in a first group of counting zones, these values being arranged in a sequence corresponding to the counting zones in the circumferential direction. Said second measurement vector is a one-dimensional vector, each vector unit of which is a value of recording times per unit time for each counting zone in a second group of counting zones, these values being arranged in a same way as those of the first measurement vector and with a same starting point.

In an embodiment, the correction-matrix establishing module is configured to: determine a number of units within the correction matrix based on a number of groups of all counting zones; set an adjustment coefficient and multiple correction coefficients; establish, based on the adjustment coefficient and multiple correction coefficients, a correction unit matrix for each measurement vector, thereby forming the correction matrix; and determine, based on the vector composed of said multiple correction coefficients as an independent variable, an optimal independent variable for which the conditional number of the correction matrix reaches or approaches a global minimum through an optimization algorithm, thereby obtaining an optimal correction matrix with the optimal independent variable. A number of correction coefficients is equal to a sum of a number of elements of the first measurement vector and that of the second measurement vector.

In an embodiment, the correction-matrix establishing module is configured to establish a correction matrix $\gamma$ with a conditional number less than 10 with an expression as follows:

$$\gamma = \gamma_1 + \gamma_2$$

wherein $\gamma_1$ is expressed as follows:

$$\gamma_1 = \begin{bmatrix} a \cdot \varphi_1 & \varphi_1 & 0 & 0 & \ldots & 0 \\ 0 & a \cdot \varphi_3 & \varphi_3 & 0 & \ldots & 0 \\ 0 & 0 & a \cdot \varphi_5 & \varphi_5 & 0 & 0 \\ 0 & 0 & 0 & a \cdot \varphi_7 & \varphi_7 & 0 \\ \vdots & \vdots & 0 & 0 & \ddots & \vdots \\ \varphi_{2n-1} & 0 & 0 & 0 & \ldots & a \cdot \varphi_{2n-1} \end{bmatrix}$$

and $\gamma_2$ is expressed as follows:

$$\gamma_2 = \begin{bmatrix} \varphi_2 & a \cdot \varphi_2 & 0 & 0 & \ldots & 0 \\ 0 & \varphi_4 & a \cdot \varphi_4 & 0 & \ldots & 0 \\ 0 & 0 & \varphi_6 & a \cdot \varphi_6 & 0 & 0 \\ 0 & 0 & 0 & \varphi_8 & a \cdot \varphi_8 & 0 \\ \vdots & \vdots & 0 & 0 & \ddots & \vdots \\ a \cdot \varphi_{2n} & 0 & 0 & 0 & \ldots & \varphi_{2n} \end{bmatrix}$$

wherein n denotes a number of sectors to be measured, a denotes the adjustment coefficient, and $[\varphi_1, \varphi_2, \varphi_3, \ldots, \varphi_{2n}]$ denotes the vector of correction coefficients.

In an embodiment, the gamma-intensity calculating module is configured to calculate the gamma intensity G of each measured sector with an expression as follows:

$$G = \gamma^{-1} \cdot (M_1 + M_2)$$

wherein $M_1$ and $M_2$ denote the first and second measurement vectors, respectively, and $\gamma$ denotes the correction matrix.

According to a further aspect of the present invention, a computer apparatus is provided, comprising a processor and a memory, said memory being stored thereon at least one instruction, at least one program, a set of codes or a set of instructions. Said at least one instruction, at least one program, said set of codes or said set of instructions is loaded and executed by said processor to perform the multi-sector data correction method for gamma imaging while drilling as mentioned above.

According to a still further aspect of the present invention, a computer readable storage medium is provided, which is stored thereon at least one instruction, at least one program, a set of codes or a set of instructions. Said at least one instruction, at least one program, said set of codes or said set of instructions is loaded and executed by said processor to perform the multi-sector data correction method for gamma imaging while drilling as mentioned above.

Compared to the prior arts, one or more embodiments of the above technical solution may have the following advantages or beneficial effects. Embodiments of the present invention provide a multi-sector data correction method for gamma imaging while drilling, wherein a counting model is introduced and then optimized by a correction matrix, so as to obtain a more accurate gamma intensity of formation sectors. With this method, problems, such as rotational measurement distortion of the gamma imaging while drilling tool or the like, can be eliminated, the measurement results of the tool can be improved, and the accuracy of calculating the formation dip angle can be enhanced. Accordingly, high-precision geosteering drilling can be achieved.

Other features and advantages of the present invention will be set forth in the description which follows, and, in part, will be apparent from the description, or may be learned from the implementation of the technical solution of the present invention. The objective and other advantages of the present invention may be realized and attained from the structure and/or process particularly pointed out in the description, claims and drawings.

BRIEF DESCRIPTION OF THE DRAWINGS

The accompanying drawings are used to provide a further understanding on the technical solution of the present application or the prior arts, and constitute a part of the description. Together with the embodiments of the present invention, the drawings illustrating the embodiments are intended to explain the technical solution of the present invention, but not constitute any limitation to the technical solution of the present invention. It the drawings.

DETAILED. DESCRIPTION OF EMBODIMENTS

Figure 1:
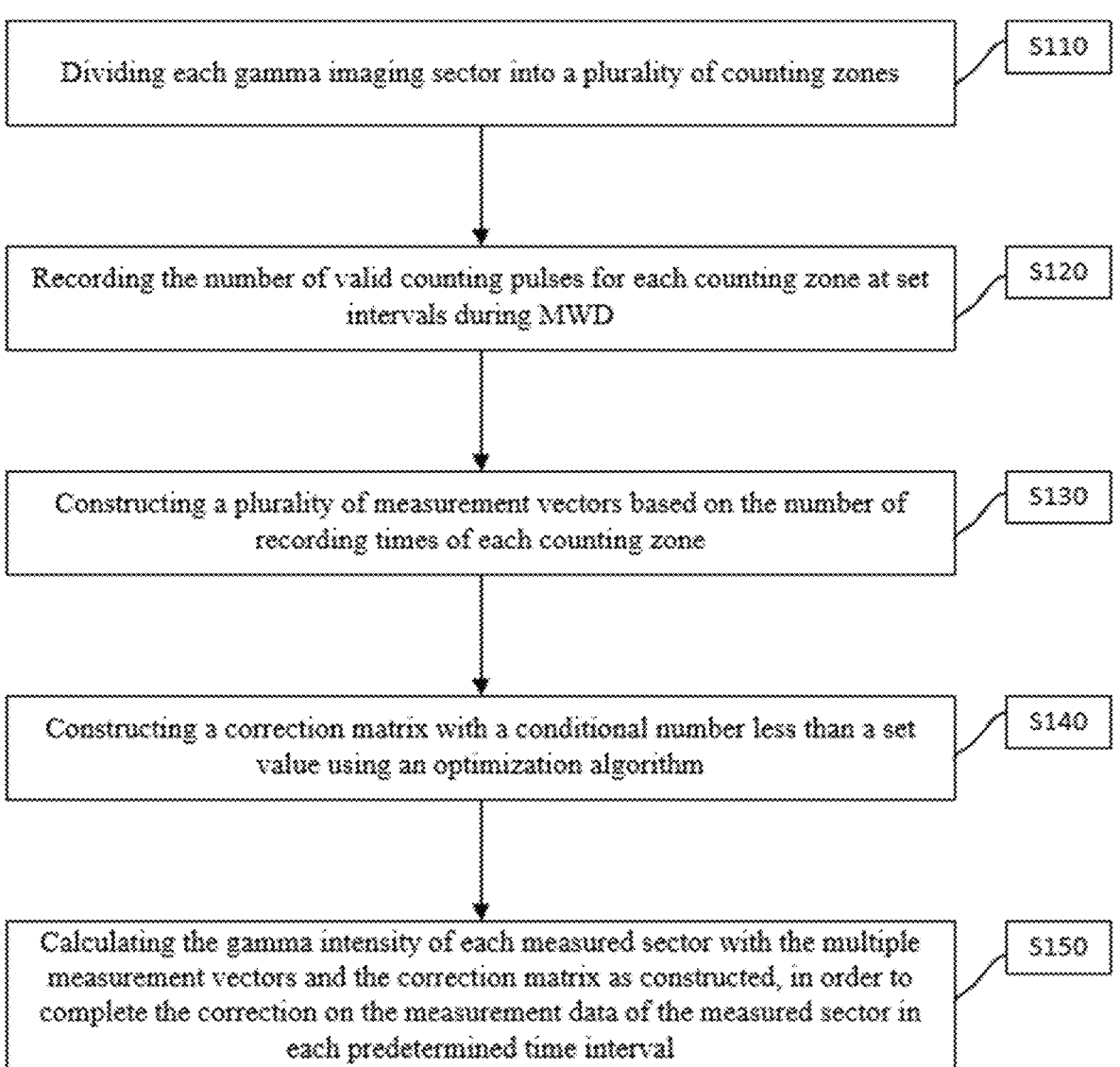
FIG. 1 schematically shows a simplified flow chart of a multi-sector data correction method for gamma imaging while drilling according to an embodiment of the present invention.

The implementation mode of the present invention will be explained in detail with reference to the embodiments and the accompanying drawings, whereby it can be fully understood how to solve the technical problem by the technical means according to the present invention, implement the technical solution, and achieve the technical effects thereof. All the embodiments and the technical features defined therein may be combined together if there is no conflict, and the technical solutions obtained in this manner all fall within the scope of protection of the present invention.

In addition, the steps illustrated in the flow chart in the drawings can be performed in a computer system containing a set of computer-executable instructions. Moreover, although a logical sequence is shown in the flow chart, in some cases these steps as shown or described may be performed in an order different from that shown herein.

First Embodiment

FIG. 1 schematically shows a flow chart of a multi-sector data correction method for gamma imaging while drilling according to an embodiment of the present invention. The specific steps of this embodiment are described below with reference to FIG. 1.

As shown in FIG. 1, in step S110, each gamma imaging sector is divided into a plurality of counting zones.

In one embodiment, in step S110, each sector is divided equally to form a plurality of counting zones, the total number of these counting zones being an even multiple of the number of the sectors.

In a preferred embodiment, the gamma imaging sectors each are divided equally to form a plurality of counting zones, wherein the total number of these counting zones is twice the number of the sectors to be measured, and each counting zone as divided is numbered. For example, as to the eight sectors A, B, C, D, E, F, G, H shown in FIG. 3, each sector is divided equally into two counting zones, thus forming 16 counting areas after divided, with serial numbers of 1, 2, 3, . . . , 16, respectively. It is readily understood that in addition to being divided into two counting zones, each gamma imaging sector can also be divided into other numbers of counting zones, for example, three, four, or the like, according to actual needs, for which there is no limitation in the embodiment. Moreover, the number of sectors to be measured can also be different, and for the sake of convenience, eight sectors to be measured are adopted in this embodiment.

In step S120, the number of valid counting pulses for each counting zone is recorded at set intervals during the measurement-while-drilling (MWD).

Specifically, if a natural gamma measurement device (e.g., a gamma sensor) detects a valid counting pulse during the measurement-while-drilling, the serial number of the counting zone corresponding to the current tool face is recorded. A recording time interval, such as 5 to 1,000 seconds, is predetermined. When the MWD is performed, the number of times that each counting zone is recorded, i.e., the number of times that the valid counting pulse occurs in each counting zone, is recorded separately for each predetermined time interval.

In step S130, a plurality of measurement vectors is constructed based on the number of times of each counting zone being recorded. Each of these measurement vectors is used to characterize the measurement results of all sectors.

Specifically, all the counting zones are divided into a plurality of groups, wherein the number of recording times per unit time for each counting zone in each group is used to construct a corresponding measurement vector. The number of the groups into which the counting zones are divided is the same as that of the counting zones into which each sector is divided, and each group of the counting zones is composed of the counting zones discontinuously extracted from each sector, wherein any adjacent counting zones in the same sector are not in the same group.

Figure 2:
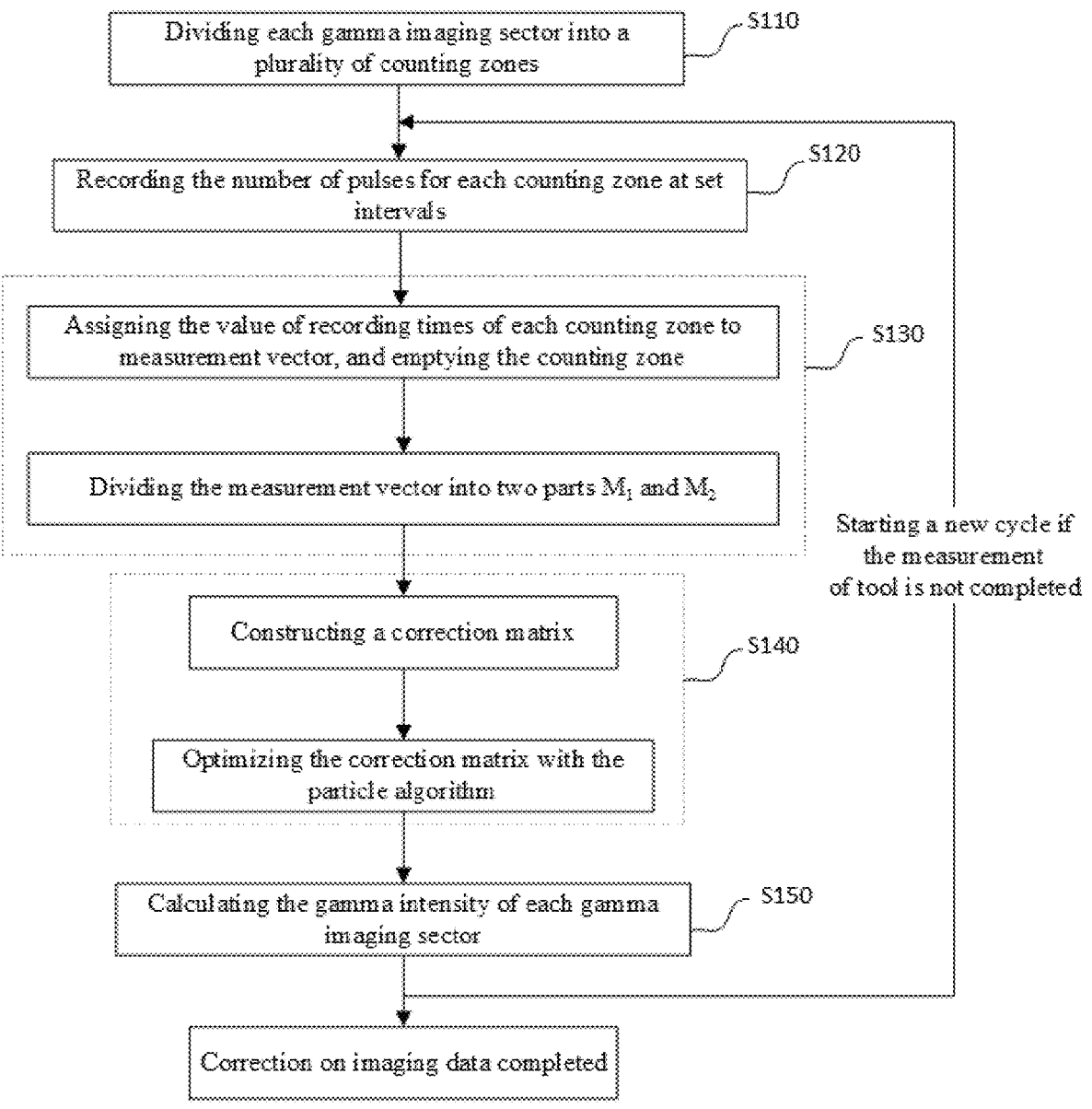
FIG. 2 schematically shows a specific flow chart of a multi-sector data correction method for gamma imaging while drilling according to an embodiment of the present invention.

Preferably, as shown in FIG. 2, in step S110 each sector is equally divided to form two counting zones. Thus in step S130, all counting areas are divided into two groups, and a first measurement vector $M_1$ and a second measurement vector $M_2$ are constructed respectively with the number of recording times per unit time of each counting zone in each group. When the counting zones are grouped, it should be ensured that any adjacent counting zones are not in the same group. That is, each group of the counting zones is formed by discontinuously extracting the counting zones from the consecutive counting zones arranged along the circumferential direction, i.e., the group is formed with the counting zones spaced from each other. In this step, the first measurement vector $M_1$ and the second measurement vector $M_2$ are both one-dimensional vectors. As to the first measurement vector $M_1$, each vector unit thereof is the value of recording times per unit time of each counting zone in a first group of counting zones, wherein these values are arranged in a sequence corresponding to the counting zones in the circumferential direction, such as in a clockwise or counterclockwise order. As to the second measurement vector $M_2$, each vector unit thereof is the value of recording times per unit time of each counting zone in the second group of counting zones, wherein these values are arranged in the same way as those of the first measurement vector $M_1$ and with the same starting point. If the values of the first measurement vector $M_1$ are arranged in the clockwise order as the counting zones corresponding to the first measurement vector $M_1$, those of the second measurement vector $M_2$ are also arranged in the clockwise order as the counting zones corresponding to the second measurement vector $M_2$.

In addition, if each sector is divided equally into three or four counting zones in step S110, three or four measurement vectors with the same number of counting zones in each sector should be constructed in step S130. Considering practical applications, it is preferred to divide each sector equally into two or four counting zones.

In step S140, a correction matrix $\gamma$ with a conditional number less than a set value is constructed using an optimization algorithm, wherein the correction matrix is used to correct the measurement data actually collected.

As shown in FIG. 2, it is an example corresponding to the case that each sector is divided into two counting zones as mentioned above. In this case, in the procedure of constructing the correction matrix, the number of units in the correction matrix to be constructed is firstly determined based on the number of groups of all counting zones. Then, an adjustment coefficient and multiple correction coefficients are set, wherein the number of correction coefficients is equal to a sum of the number of elements of the first measurement vector and that of the second measurement vector. Subsequently, according to the set adjustment coefficient and multiple correction coefficients, a correction unit matrix for each measurement vector is established, thereby forming the correction matrix. Finally, based on the vector composed of said multiple correction coefficients as an independent variable, an optimal independent variable for which the conditional number of the correction matrix reaches or approaches the global minimum is determined through an optimization algorithm, thereby obtaining an optimal correction matrix with the current optimal independent variable.

Preferably, in this step, a correction matrix $\gamma$ with a conditional number less than 10 is constructed with the following expression:

$$\gamma = \gamma_1 + \gamma_2 \tag{1}$$

wherein $\gamma_1$ is expressed as follows:

$$\gamma_1 = \begin{bmatrix} a \cdot \varphi_1 & \varphi_1 & 0 & 0 & \ldots & 0 \\ 0 & a \cdot \varphi_3 & \varphi_3 & 0 & \ldots & 0 \\ 0 & 0 & a \cdot \varphi_5 & \varphi_5 & 0 & 0 \\ 0 & 0 & 0 & a \cdot \varphi_7 & \varphi_7 & 0 \\ \vdots & \vdots & 0 & 0 & \ddots & \vdots \\ \varphi_{2n-1} & 0 & 0 & 0 & \ldots & a \cdot \varphi_{2n-1} \end{bmatrix} \tag{2}$$

and $\gamma_2$ is expressed as follows:

$$\gamma_2 = \begin{bmatrix} \varphi_2 & a \cdot \varphi_2 & 0 & 0 & \ldots & 0 \\ 0 & \varphi_4 & a \cdot \varphi_4 & 0 & \ldots & 0 \\ 0 & 0 & \varphi_6 & a \cdot \varphi_6 & 0 & 0 \\ 0 & 0 & 0 & \varphi_8 & a \cdot \varphi_8 & 0 \\ \vdots & \vdots & 0 & 0 & \ddots & \vdots \\ a \cdot \varphi_{2n} & 0 & 0 & 0 & \ldots & \varphi_{2n} \end{bmatrix} \tag{3}$$

wherein n denotes the number of the sectors to be measured by the gamma imaging tool, a denotes the adjustment coefficient, and $[\varphi_1, \varphi_2, \varphi_3, \ldots, \varphi_{2n}]$ denotes the vector of correction coefficients.

Preferably, with $[\varphi_1, \varphi_2, \varphi_3, \ldots, \varphi_{2n}]$ as the independent variable, the parameter vector $\varphi$ is adjusted with an optimization algorithm of finding the maximum value. For example, the parameter vector $\varphi$ that enables the conditional number $\|\gamma_1+\gamma_2\|*\|(\gamma_1+\gamma_2)^{-1}\|$ of $\gamma=\gamma_1+\gamma_2$ reaches or approaches the global minimum value, which must not be greater than 100, can be found by the particle algorithm, so that the vectors of $[\varphi_1, \varphi_2, \varphi_3, \ldots, \varphi_{2n}]$ satisfying the condition are brought into the matrix of $\gamma=\gamma_1+\gamma_2$, thus forming the optimal correction matrix.

In another embodiment, if four measurement vectors are established in step S130, expression (1) is then deformed as $\gamma=\gamma_1+\gamma_2+\gamma_3+\gamma_4$. Thus four matrices $\gamma_1$, $\gamma_2$, $\gamma_3$, and $\gamma_4$ as indicated in the following expressions are necessary, wherein the coefficients thereof are also adjusted. Through adjusting the parameter vector $\varphi$ with the particle algorithm so that the conditional number $\|\gamma_1+\gamma_2+\gamma_3+\gamma_4\|*\|(\gamma_1+\gamma_2+\gamma_3+\gamma_4)^{-1}\|$ of $\gamma=\gamma_1+\gamma_2+\gamma_3+\gamma_4$ reaches or approaches the global minimum value, which is generally not greater than 100, the vectors satisfying the condition are substituted into the above deformed correction matrix.

$$\gamma_1 = \begin{bmatrix} a\cdot\varphi_1 & \varphi_1 & 0 & 0 & \ldots & 0 \\ 0 & a\cdot\varphi_5 & \varphi_5 & 0 & \ldots & 0 \\ 0 & 0 & a\cdot\varphi_9 & \varphi_9 & 0 & 0 \\ 0 & 0 & 0 & a\cdot\varphi_{13} & \varphi_{13} & 0 \\ \vdots & \vdots & 0 & 0 & \ddots & \vdots \\ \varphi_{4n-3} & 0 & 0 & 0 & \ldots & a\cdot\varphi_{4n-3} \end{bmatrix}$$

$$\gamma_2 = \begin{bmatrix} b\cdot\varphi_2 & \varphi_2 & 0 & 0 & \ldots & 0 \\ 0 & b\cdot\varphi_6 & \varphi_6 & 0 & \ldots & 0 \\ 0 & 0 & b\cdot\varphi_{10} & \varphi_{10} & 0 & 0 \\ 0 & 0 & 0 & b\cdot\varphi_{14} & a\cdot\varphi_{14} & 0 \\ \vdots & \vdots & 0 & 0 & \ddots & \vdots \\ \varphi_{4n-2} & 0 & 0 & 0 & \ldots & b\cdot\varphi_{4n-2} \end{bmatrix}$$

$$\gamma_3 = \begin{bmatrix} \varphi_3 & b\cdot\varphi_3 & 0 & 0 & \ldots & 0 \\ 0 & \varphi_7 & b\cdot\varphi_7 & 0 & \ldots & 0 \\ 0 & 0 & \varphi_{11} & b\cdot\varphi_{11} & 0 & 0 \\ 0 & 0 & 0 & \varphi_{15} & b\cdot\varphi_{15} & 0 \\ \vdots & \vdots & 0 & 0 & \ddots & \vdots \\ b\cdot\varphi_{4n-3} & 0 & 0 & 0 & \ldots & \varphi_{4n-3} \end{bmatrix}$$

$$\gamma_4 = \begin{bmatrix} \varphi_4 & a\cdot\varphi_4 & 0 & 0 & \ldots & 0 \\ 0 & \varphi_8 & a\cdot\varphi_8 & 0 & \ldots & 0 \\ 0 & 0 & \varphi_{12} & a\cdot\varphi_{12} & 0 & 0 \\ 0 & 0 & 0 & \varphi_{16} & a\cdot\varphi_{16} & 0 \\ \vdots & \vdots & 0 & 0 & \ddots & \vdots \\ a\cdot\varphi_{4n} & 0 & 0 & 0 & \ldots & \varphi_{4n} \end{bmatrix}$$

Although, as shown in FIG. 2, it is possible to re-establish a new correction matrix each time when the sector gamma intensity is corrected (step S140), in other embodiments it is also feasible to keep using the correction matrix established when the data correction is performed for the first time, which also has a calculation accuracy meeting the basic requirements, but rather establishing a new correction matrix each time. The present invention would not be restricted in this connection. Moreover, the correction matrix can be established in other manners different from the foregoing, dependent on the actual conditions. For example, in principle, the conditioning number must be at least less than 100, or the correction matrix for the case where each sector is divided into four counting zones as mentioned above can be transformed into a correction matrix for the case where each sector is divided into three counting zones, which also falls within the scope of the present invention.

In step S150, the gamma intensity of each measured sector is calculated with the multiple measurement vectors and the correction matrix as constructed, in order to complete the correction on the measurement data of the measured sector in each predetermined time interval.

The gamma intensity G of each measured sector is calculated with the following expression:

$$G = \gamma^{-1}\cdot(M_1 + M_2 + \ldots + M_n) \tag{4}$$

wherein $M_n$ denotes the $n^{th}$ measurement vector, $\gamma$ is the correction matrix, $\gamma=\gamma_1+\gamma_2+ \ldots +\gamma_n$, and $\gamma_n$ denotes the $n^{th}$ optimization matrix.

If two measurement vectors are constructed, the gamma intensity G of each measured sector is calculated with the first measurement vector $M_1$, the second measurement vector $M_2$ and the correction matrix $\gamma$.

Specifically, the gamma intensity G of each measured sector is calculated with the following expression:

$$G = \gamma^{-1}\cdot(M_1 + M_2).$$

If four measurement vectors are constructed, the expression is deformed as:

$$G = (\gamma1 + \gamma2 + \gamma3 + \gamma4)^{-1}\cdot(M_1 + M_2 + M_3 + M_4).$$

In summary, according to the multi-sector data correction method for gamma imaging while drilling as proposed in the embodiment of the present invention, a counting model is introduced and then optimized by a correction matrix, so as to obtain a more accurate gamma intensity of formation sectors. With this method, dynamic measurement distortion caused by the rotation of the MWD tool can be eliminated, thus improving the accuracy of calculating the formation dip angle from both theoretical limits and practical applications, and providing a solid foundation for high-precision geo-steering technology and even intelligent drilling technology.

EXAMPLE

Figure 3:
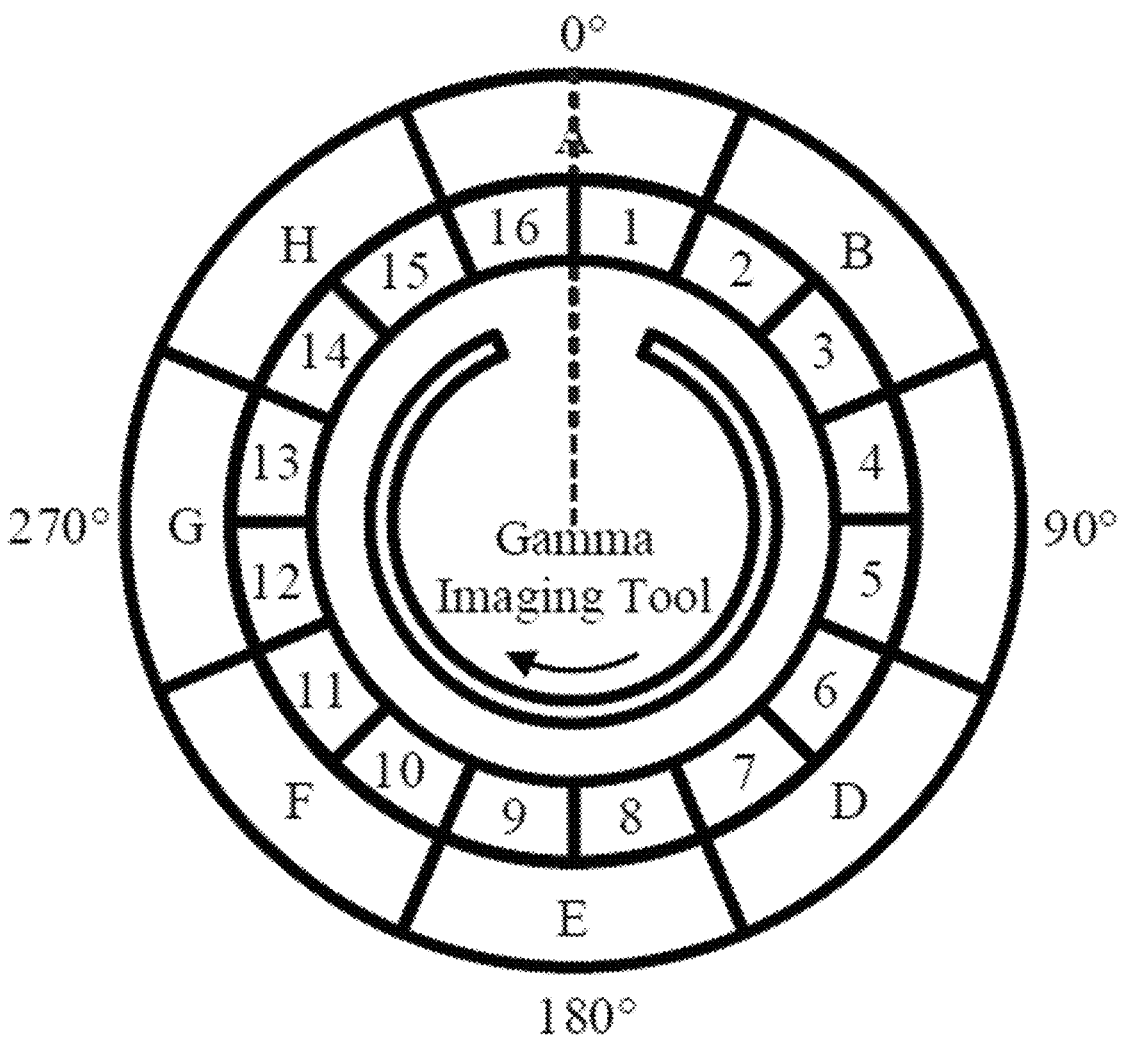
FIG. 3 schematically shows counting areas in eight sectors, as an example, according to an embodiment of the present invention.

In order to better understand the technical method of the present invention, the specific steps of using the aforementioned multi-sector data correction method for gamma imaging while drilling will be illustrated in the following with eight sectors as shown in FIG. 3 as an example.

In Step 1, in accordance with general practice in the industry, eight sectors to be measured by gamma imaging while drilling are numbered as A, B, C, . . . , H in sequence, and each sector to be measured is divided into two counting zones, numbered as 1, 2, 3, . . . , 16 in sequence, as shown in FIG. 3.

In Step 2, during the operation of the gamma imaging tool, whenever the acquisition circuit receives a valid counting signal from the gamma sensor, the processor records the current tool face and adds 1 to the value of recording times of the counting zone corresponding to the tool face.

In Step 3, every 32 seconds, the counting value of the current counting zone is assigned to the vector M, wherein $M=[m_1, m_2, m_3, \ldots, m_{16}]$, and $m_1$ corresponds to the value of recording times of pulse of the first counting zone, $m_2$ corresponds to the value of recording times of pulse of the second counting zone, and so on. When the assignment is completed, the value of recording times of the counting zone is returned to zero.

In Step 4, the vector M is divided into two measurement vectors, i.e., $M_1$ and $M_2$, wherein $M_1=[m_1, m_3, m_5, \ldots, m_{15}]$ and $M_2=[m_2, m_4, m_6, \ldots, m_{16}]$.

In Step 5, a correction matrix $\gamma=\gamma_1+\gamma_2$ is constructed, wherein:

$$\gamma_1 = \begin{bmatrix} \frac{3}{16}\varphi_1 & \frac{1}{16}\varphi_1 & 0 & 0 & \ldots & 0 \\ 0 & \frac{3}{16}\varphi_3 & \frac{1}{16}\varphi_3 & 0 & \ldots & 0 \\ 0 & 0 & \frac{3}{16}\varphi_5 & \frac{1}{16}\varphi_5 & 0 & 0 \\ 0 & 0 & 0 & \frac{3}{16}\varphi_7 & \frac{1}{16}\varphi_7 & 0 \\ \vdots & \vdots & 0 & 0 & \ddots & \vdots \\ \frac{1}{16}\varphi_{15} & 0 & 0 & 0 & \ldots & \frac{3}{16}\varphi_{15} \end{bmatrix}$$

$$\gamma_2 = \begin{bmatrix} \frac{1}{16}\varphi_2 & \frac{3}{16}\varphi_2 & 0 & 0 & \ldots & 0 \\ 0 & \frac{1}{16}\varphi_4 & \frac{3}{16}\varphi_4 & 0 & \ldots & 0 \\ 0 & 0 & \frac{1}{16}\varphi_6 & \frac{3}{16}\varphi_6 & 0 & 0 \\ 0 & 0 & 0 & \frac{1}{16}\varphi_8 & \frac{3}{16}\varphi_8 & 0 \\ \vdots & \vdots & 0 & 0 & \ddots & \vdots \\ \frac{3}{16}\varphi_{16} & 0 & 0 & 0 & \ldots & \frac{1}{16}\varphi_{16} \end{bmatrix}$$

In Step 6, the minimum value of $\|\gamma_1+\gamma_2\|*\|(\gamma_1+\gamma_2)^{-1}\|$, which should be less than 10, is found through the particle algorithm with $[\varphi_1, \varphi_2, \varphi_3, \ldots, \varphi_{16}]$ as variables. Then, the vectors $[\varphi_1, \varphi_2, \varphi_3, \ldots, \varphi_{16}]$ satisfying the condition are brought into the matrix $\gamma$ to form the optimal correction matrix.

In Step 7, the gamma intensity $G=[G_A\ G_B\ G_C \ldots G_H]$ of each sector is calculated with the following expression:

$$G = \gamma^{-1} \cdot (M_1 + M_2).$$

In Step 8, the procedure from Step 3 to Step 7 is repeated continuously, thus obtaining the corrected gamma intensity for the eight-sector formation.

Figure 5A:
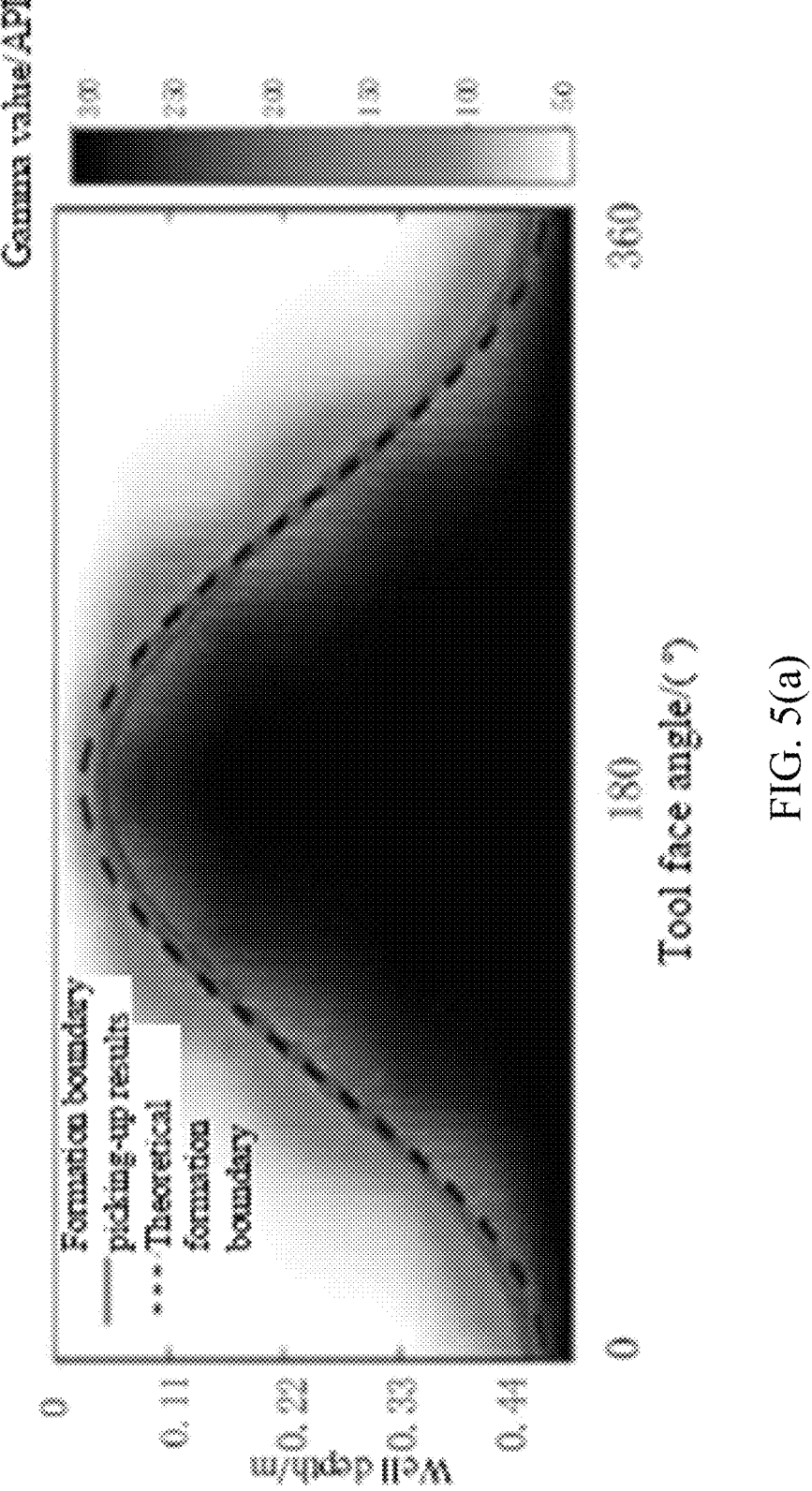
FIG. 5(a) and FIG. 5(b) schematically show the imaging results without and with the multi-sector data correction method according to an embodiment of the present invention, respectively.
Figure 5B:
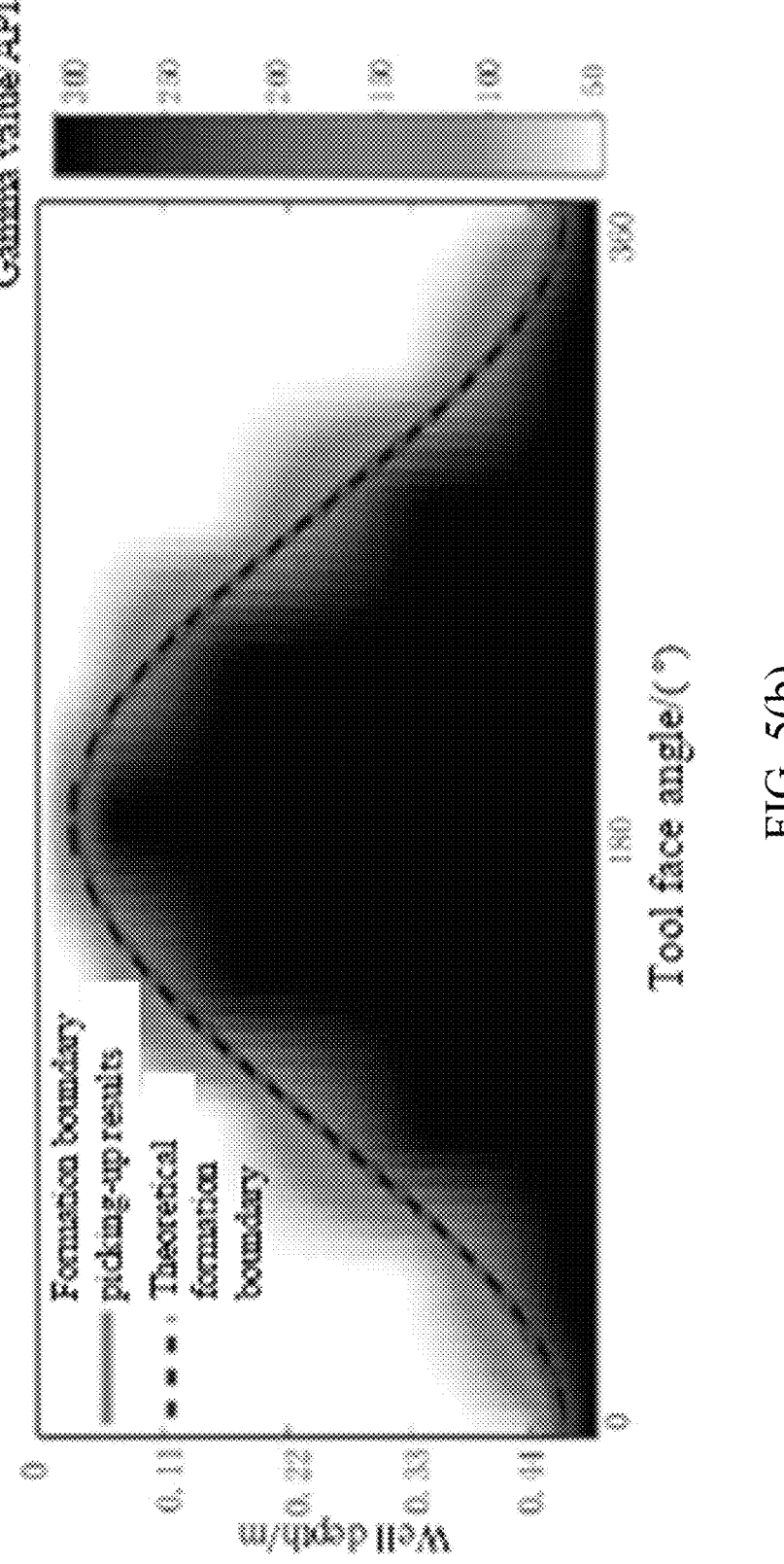

FIG. 5(a) schematically shows the imaging results without the multi-sector data correction method according to the embodiment of the present invention, while FIG. 5(b) schematically shows the imaging results with the multi-sector data correction method according to the embodiment of the present invention. As shown in FIG. 5(a), the gamma image is distorted due to rotational distortion, resulting in that the extracted formation boundary (solid line) deviates away from the theoretical value (black dashed line). The imaging results using the multi-sector data correction method according to the present embodiment under exactly the same experimental conditions are shown in FIG. 5(b). The results show that when the rotating sector algorithm is incorporated in the gamma imaging tool, the formation boundary picked up by the gamma imaging results is substantially coincident with the theoretical formation boundary obtained by an experimental apparatus.

Figure 6:
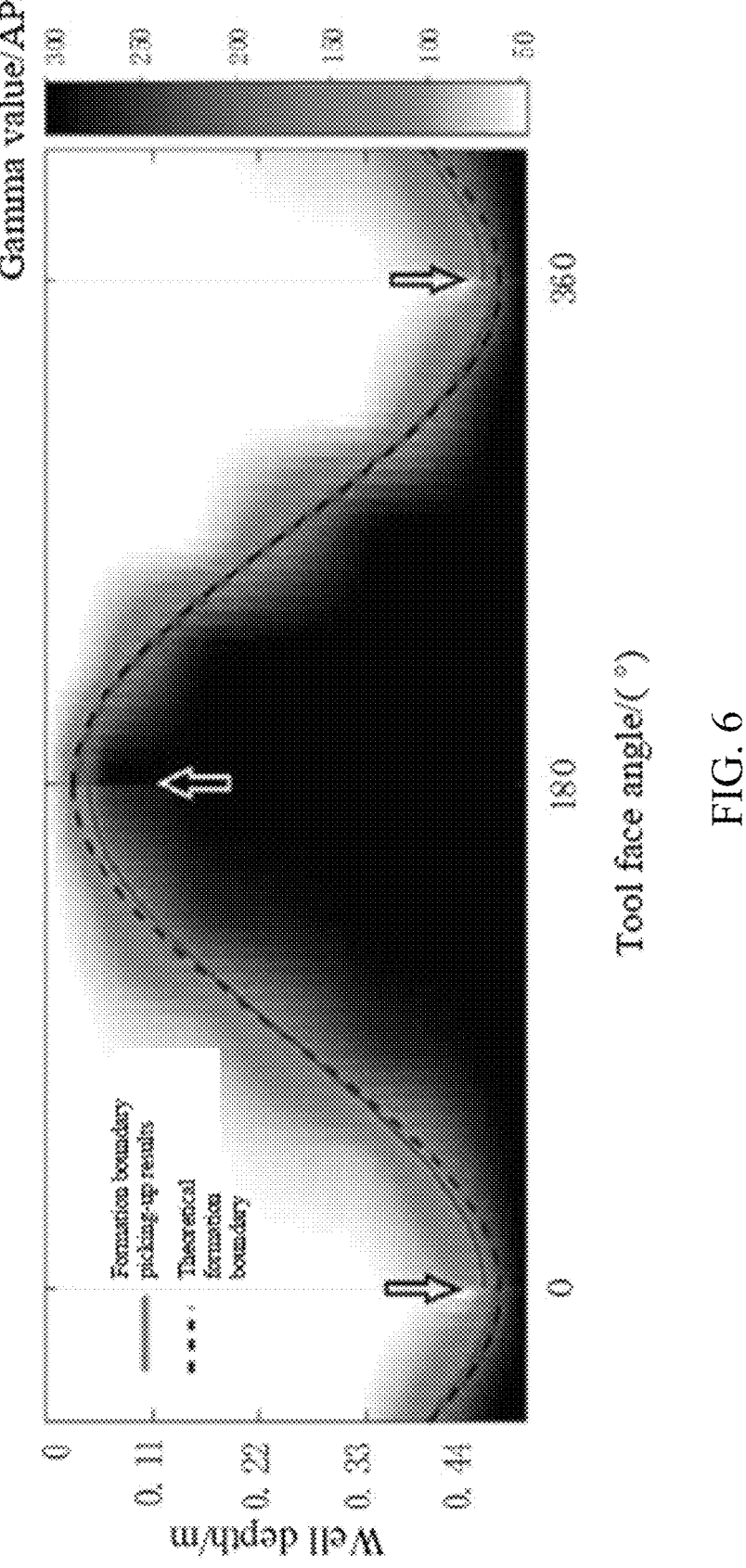
FIG. 6 schematically shows a comparison of the imaging maps and formation boundary picking-up results before and after using the multi-sector data correction method according to an embodiment of the present invention.

A further comparison between the above two gamma imaging results is shown in FIG. 6. As shown by the black imaging area indicated with the middle arrow, there are obvious differences between the images generated by the two methods. The highly radioactive area of the left image without using the method of the present embodiment is lower than that of the right image, indicating that the left image is less sensitive to the gamma change in the formation and slower in response.

Second Embodiment

Figure 4:
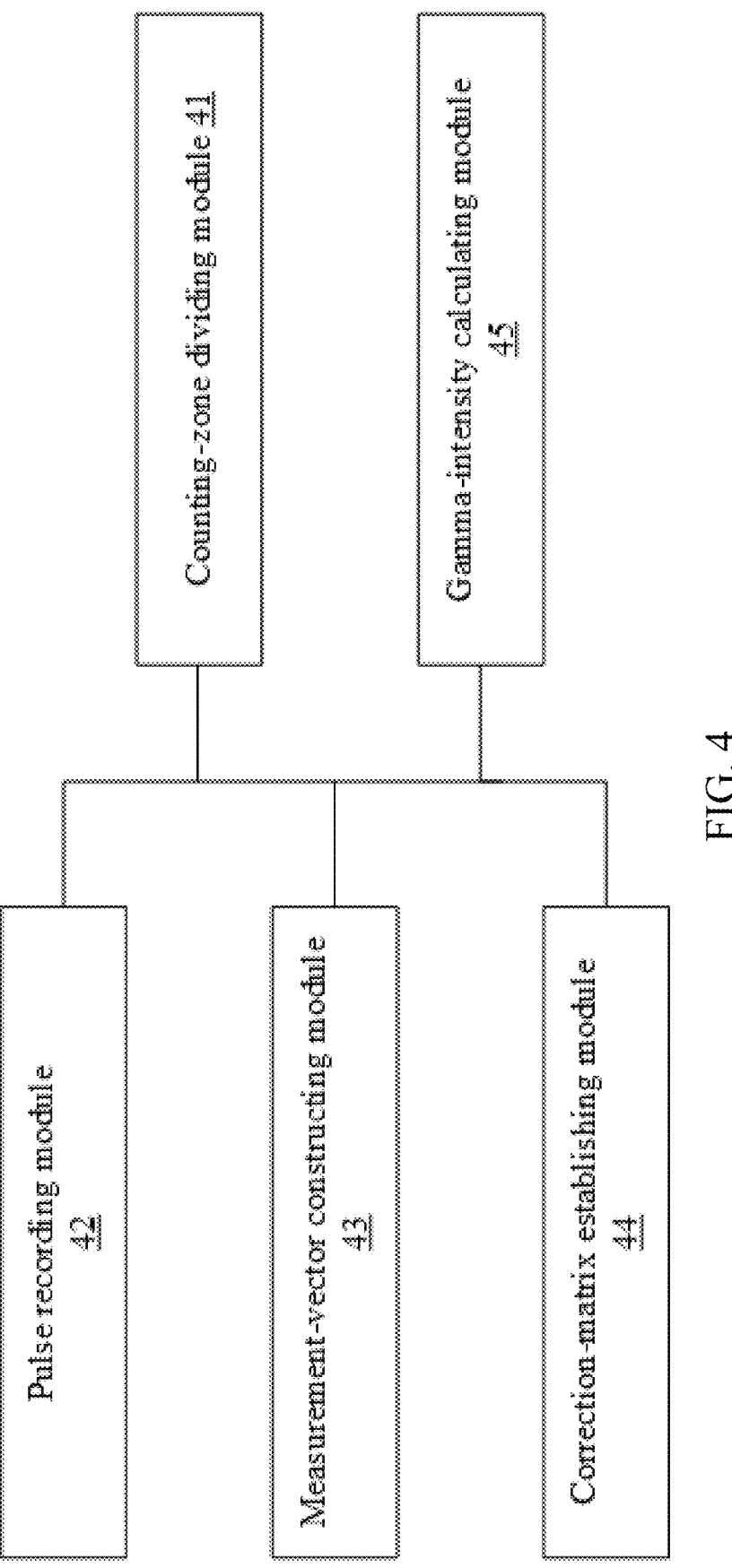
FIG. 4 schematically shows a functional frame of a multi-sector data correction system for gamma imaging while drilling according to an embodiment of the present invention.

FIG. 4 schematically shows a functional frame of a multi-sector data correction system for gamma imaging while drilling according to an embodiment of the present invention. The structure and function of the correction system are described below with reference to FIG. 4.

As shown in FIG. 4, the multi-sector data correction system comprises a counting-zone dividing module 41, a pulse recording module 42, a measurement-vector constructing module 43, a correction-matrix establishing module 44, and a gamma-intensity calculating module 45. The counting-zone dividing module 41 is used to divide each gamma imaging sector into multiple counting zones. The pulse recording module 42 is used to count the number of the valid counting pulses in each counting zone at a predetermined time interval during the MWD. The measurement-vector constructing module 43 is used to construct a plurality of measurement vectors based on the number of recording times in each counting zone. The correction-matrix establishing module 44 is used to establish a correction matrix with a conditional number less than a set value. The gamma-intensity calculating module 45 is used to calculate the gamma intensity of each measured sector with the plurality of measurement vectors and the correction matrix as constructed, in order to complete the data correction on the measured sector for each set time interval.

The counting-zone dividing module 41, the pulse recording module 42, the measurement-vector constructing module 43, the correction-matrix establishing module 44 and the gamma-intensity calculating module 45 of the present embodiment can perform corresponding steps, i.e., steps S110~S150, of the method of the first embodiment respectively, with reasonable configurations. Therefore, details of these modules are not discussed here.

It should be understood that the embodiments of the present invention are not limited to the processing steps disclosed herein, but should extend to equivalent substitutions of these features understood by one ordinarily skilled in the art. It should also be understood that the terminology used herein is for the purpose of describing a particular embodiment only, rather than being construed as restriction.

The phrase "an embodiment" or "embodiments" as mentioned in the description means that the particular features, structures or characteristics described in conjunction with the embodiment or embodiments are included in at least one embodiment of the present invention. Thus, the phrase "an embodiment" or "embodiments" used throughout the description does not necessarily refer to the same embodiment.

Although the embodiments of the present invention are described hereinabove, the disclosure is provided to facilitate the understanding of the implementing mode of the present invention, but rather restricting the present invention. Without departing from the spirit and scope of the present disclosure, one skilled in the art can make various modifications and improvements in forms and details of the implementing mode. The scope of protection of the present invention shall be determined by the appending claims.

The invention claimed is:

1. A multi-sector data correction method for gamma imaging while drilling, comprising:

S1: placing a gamma imaging tool into a wellbore in a formation, wherein the gamma imaging tool comprises a gamma sensor with azimuth blanking and an acquisition circuit signally connected to the gamma sensor and a processor;

S2: dividing a circumference of the wellbore into a plurality of gamma imaging sectors, and dividing each gamma imaging sector into a plurality of counting zones, each counting zone corresponds to one tool face of the gamma imaging tool;

S3: counting a number of valid counting pulses for each counting zone at a predetermined time interval during measurement while drilling using the gamma sensor, which comprises:

S31: rotating the gamma imaging tool;

S32: transmitting a valid counting signal to the acquisition circuit upon receiving a valid counting pulse at the gamma sensor, and, S33: recording, by the processor, a current tool face of the gamma imaging tool and a serial number of the counting zone corresponding to the current tool face;

S4: constructing a plurality of measurement vectors featuring measurement results of all the plurality of gamma imaging sectors based on a value of recording times of each counting zone;

S5: establishing a correction matrix with a conditional number less than a set value, said correction matrix being used to correct measurement data; and S6: calculating a gamma intensity of each measured sector with the plurality of measurement vectors and the correction matrix as constructed to correct measurement data of each measured sector for each predetermined time interval.

2. The multi-sector data correction method for gamma imaging while drilling according to claim 1, wherein in S4, all the counting zones are divided into a plurality of groups, and the value of recording times of each counting zone in each group is used to construct a corresponding measurement vector, wherein a number of groups into which the counting zones are divided is equal to a number of the counting zones formed by equally dividing each sector, and each group of counting zones is composed of the counting zones that are discontinuously extracted from each sector, any adjacent counting zones in a same sector not being in a same group.

3. The multi-sector data correction method for gamma imaging while drilling according to claim 1, wherein in S6, the gamma intensity G of each measured sector is calculated with an expression as follows:

$$G = \gamma^{-1} \cdot (M_1 + M_2 + \ldots + M_n)$$

wherein $M_n$ denotes the $n^{th}$ measurement vector, $\gamma$ is the correction matrix, $\gamma = \gamma_1 + \gamma_2 + \ldots + \gamma_n$, and $\gamma_n$ denotes the $n^{th}$ optimization matrix.

4. The multi-sector data correction method for gamma imaging while drilling according to claim 3, wherein in S4, all the counting zones are divided into two groups, and a first measurement vector and a second measurement vector are constructed respectively with the value of recording times per unit time for each counting zone in each group, wherein each group of the counting zones is formed by discontinuously extracting the counting zones from consecutive counting zones arranged along a circumferential direction, any adjacent counting zones not being in the same group;

wherein said first measurement vector is a one-dimensional vector, each vector unit of which is a value of recording times per unit time for each counting zone in a first group of counting zones, these values being arranged in a sequence corresponding to the counting zones in the circumferential direction; and said second measurement vector is a one-dimensional vector, each vector unit of which is a value of recording times per unit time for each counting zone in a second group of counting zones, these values being arranged in a same way as those of the first measurement vector and with a same starting point.

5. The multi-sector data correction method for gamma imaging while drilling according to claim 4, wherein the step of constructing said correction matrix comprises:

determining a number of units within the correction matrix based on a number of groups of all counting zones;

setting an adjustment coefficient and multiple correction coefficients, wherein a number of correction coefficients is equal to a sum of a number of elements of the first measurement vector and that of the second measurement vector;

establishing, based on the adjustment coefficient and multiple correction coefficients, a correction unit matrix for each measurement vector, thereby forming the correction matrix; and determining, based on the vector composed of said multiple correction coefficients as an independent variable, an optimal independent variable for which the conditional number of the correction matrix reaches or approaches a global minimum through an optimization algorithm, thereby obtaining an optimal correction matrix with the optimal independent variable.

6. The multi-sector data correction method for gamma imaging while drilling according to claim 5, wherein in S5, a correction matrix y with a conditional number less than 10 is constructed with an expression as follows:

$$\gamma = \gamma_1 + \gamma_2$$

wherein $\gamma_1$ is expressed as follows:

$$\gamma_1 = \begin{bmatrix} a \cdot \varphi_1 & \varphi_1 & 0 & 0 & \ldots & 0 \\ 0 & a \cdot \varphi_3 & \varphi_3 & 0 & \ldots & 0 \\ 0 & 0 & a \cdot \varphi_5 & \varphi_5 & 0 & 0 \\ 0 & 0 & 0 & a \cdot \varphi_7 & \varphi_7 & 0 \\ \vdots & \vdots & 0 & 0 & \ddots & \vdots \\ \varphi_{2n-1} & 0 & 0 & 0 & \ldots & a \cdot \varphi_{2n-1} \end{bmatrix}$$

and $\gamma_2$ is expressed as follows:

$$\gamma_2 = \begin{bmatrix} \varphi_2 & a \cdot \varphi_2 & 0 & 0 & \ldots & 0 \\ 0 & \varphi_4 & a \cdot \varphi_4 & 0 & \ldots & 0 \\ 0 & 0 & \varphi_6 & a \cdot \varphi_6 & 0 & 0 \\ 0 & 0 & 0 & \varphi_8 & a \cdot \varphi_8 & 0 \\ \vdots & \vdots & 0 & 0 & \ddots & \vdots \\ a \cdot \varphi_{2n} & 0 & 0 & 0 & \ldots & \varphi_{2n} \end{bmatrix}$$

wherein n denotes a number of sectors to be measured, $\alpha$ denotes the adjustment coefficient, and $[\varphi_1, \varphi_2, \varphi_3, \ldots, \varphi_{2n}]$ denotes the vector of correction coefficients.

7. The multi-sector data correction method for gamma imaging while drilling according to claim 6, wherein in S6, the gamma intensity G of each measured sector is calculated with an expression as follows:

$$G = \gamma^{-1} \cdot (M_1 + M_2)$$

wherein $M_1$ and $M_2$ denote the first and second measurement vectors, respectively, and $\gamma$ denotes the correction matrix after optimization.

8. A computer apparatus, comprising a processor and a memory, said memory being stored thereon at least one instruction, at least one program, a set of codes or a set of instructions, wherein said at least one instruction, at least one program, said set of codes or said set of instructions is loaded and executed by said processor to perform the multi-sector data correction method for gamma imaging while drilling according to claim 1.

9. A computer readable storage medium, stored thereon at least one instruction, at least one program, a set of codes or a set of instructions, wherein said at least one instruction, at least one program, said set of codes or said set of instructions is loaded and executed by said processor to perform the multi-sector data correction method for gamma imaging while drilling according to claim 1.

\* \* \* \* \*